March 10, 1953 C. E. BECK 2,630,622
AUTOMATIC FEED FOR POWER SAWS
Filed Nov. 5, 1949 2 SHEETS—SHEET 2

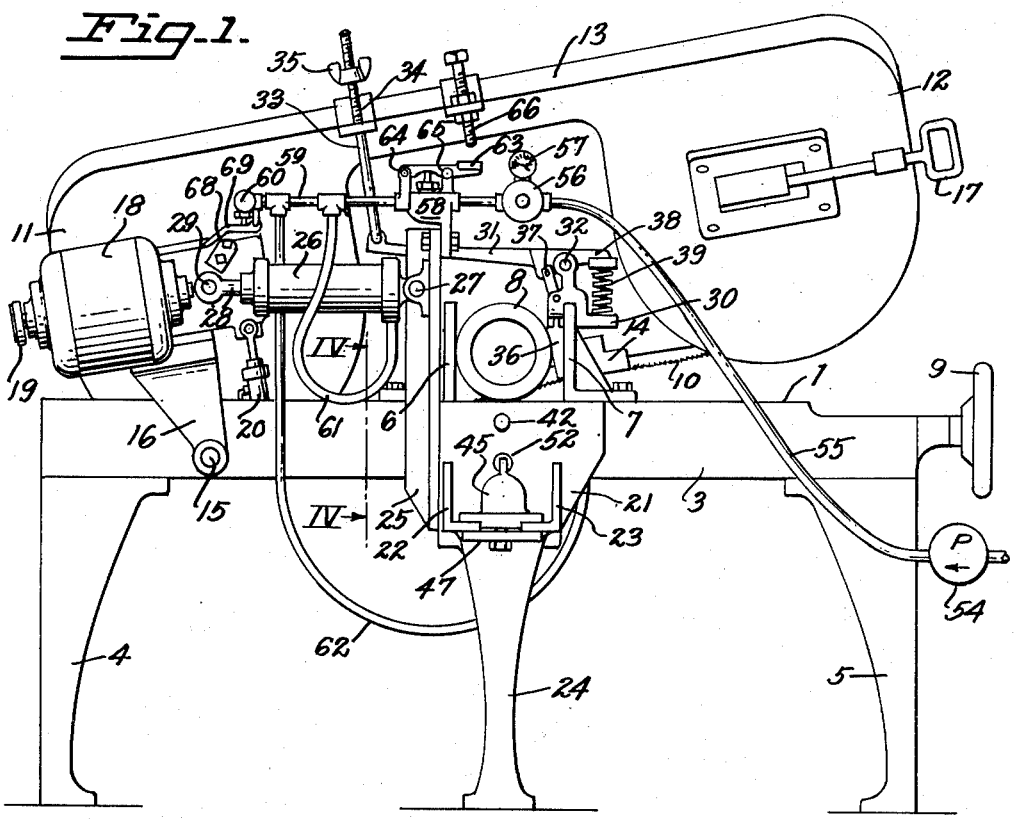

INVENTOR.
CARL E. BECK
BY
ATTORNEY

Patented Mar. 10, 1953

2,630,622

UNITED STATES PATENT OFFICE 2,630,622

AUTOMATIC FEED FOR POWER SAWS

Carl E. Beck, San Francisco, Calif.

Application November 5, 1949, Serial No. 125,736

4 Claims. (Cl. 29—69)

Among the objects of the invention is the provision of automatic means for intermittently feeding metal stock to automatic saws in progressive sequence.

Another object is the adaptation of the invention as an accessory to present power saws which are limited to one cut at a time with manual feeding means.

Other objects and advantages will appear as the description proceeds. In the specification and the accompanying drawings the invention is disclosed in its preferred form. But it is to be understood that it is not limited to this form; because it may be embodied in modifications within the spirit of the invention as defined in the claims following the description.

In the two sheets of drawings:

Fig. 1 is rear elevation of a conventional power hack saw having this invention applied thereto.

Fig. 2 is an enlarged detail in side elevation of the metal stock supporting and feeding assembly attached to the rear side of the table of a power hack saw.

Fig. 3 is a rear end view of the same in vertical section on the line III—III Fig. 2.

Figure 4:
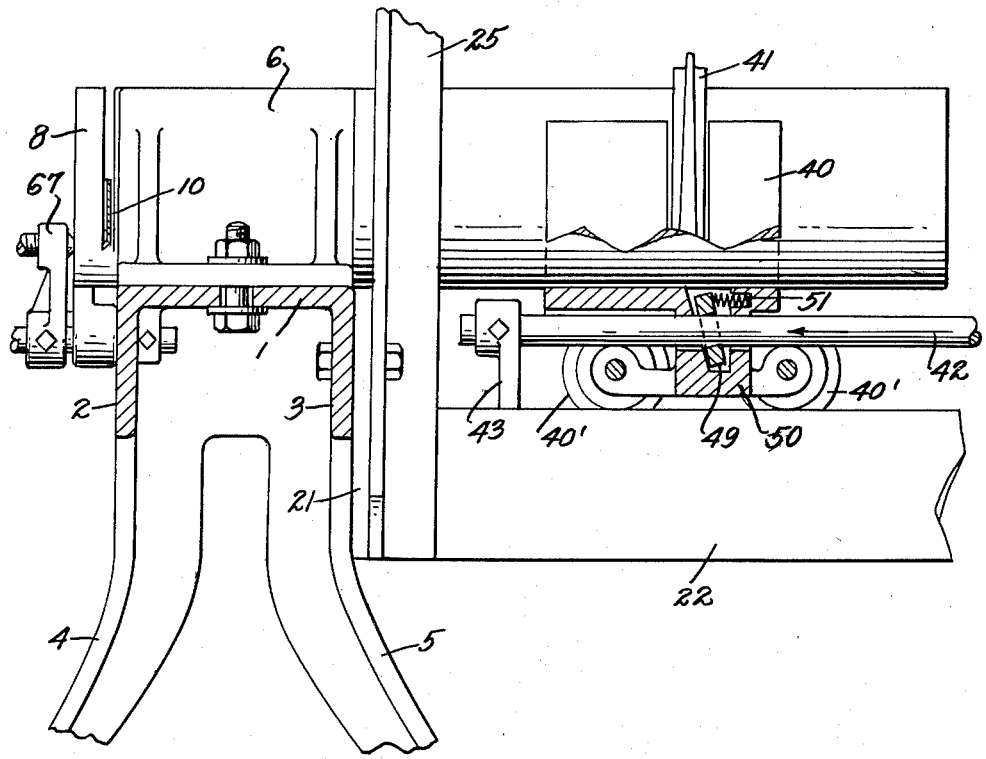
Fig. 4 is an enlarged detail similar to Fig. 2, showing the table of the hack saw frame in vertical section on the line IV—IV Fig. 1.

In detail the structure shown in Fig. 1 is a rear elevation of power driven cut off band hack saw known in the trade under the name Kalamazoo. It comprises the table 1 having the side flanges 2, 3 and is supported by end legs 4, 5. The stock holding vise has the opposed jaws 6, 7, bolted to the table 1 for clamping the metal stock such as 8 in the path of the hack saw. One of these vise jaws is adjusted by a threaded spindle concealed within the table and manually operated by the handwheel 9 before the jaw is bolted to the table top.

The band saw 10 is mounted upon revolving pulleys concealed within the shields 11, 12, joined at the top by the frame strut 13. These shields and their saw pulleys are tilted at an angle to the vertical to clear the stock 8 being sawed. This requires that the blade be given a slight torsional adjustment to the vertical plane of the cut. This is done by a pair of guides such as 14 mounted on the pulley frame on opposite sides of the stock 8.

The pulley frame is pivoted at 15 on the opposite sides of the flanges 2, 3 by the bracket 16 bolted to the pulley frame which is manually raised and lowered on the pivot 15 by the handle 17 on the pulley shield 12.

The pulley within the shield 11 is driven by the motor 18 and the belt 19 driving a suitable gearing interposed between the belt and the shaft of the pulley. This is common practice so details have been omitted in the general structure of the band saw assembly to avoid confusion with the structure of the feeding attachments.

Normally the saw frame pivoted at 15 descends by gravity as the saw 10 cuts through the stock 8. To prevent violent falling of the saw frame against the stock the hydraulic cylinder 20 is interposed between the saw frame and the table 1 so that the frame will descend at slow sawing speed only.

Referring to Fig. 1 the structure of the present automatic feed comprises the end plate 21 bolted to the flange 3 of the saw table. The ends of the angle bar rails 22, 23 are welded to the face of the plate 21 and extended laterally from the table and are supported by the leg 24 at their outer ends. The lower portion of the angle bar support 25 is welded to the plate 21 and extends upwardly to near the top level of the saw frame.

The air pressure cylinder 26 is pivoted at 27 to the bar 25 and has the piston rod 28 pivoted at 29 to the shield 11, for automatically lifting the saw frame by swinging it on the pivot 15 when the piston within the cylinder is advanced by air pressure as hereinafter described.

The automatic vise for holding the stock 8 in sawing position comprises the bracket 30 bolted or welded to the upper edge of the vise jaw 7. The lever 31 is fulcrumed at 32 on the bracket 30 and has its outer end pivoted to the link 33 passing through the bracket trip 34 mounted upon the saw frame 13. This stem has the wingnut 35 threaded thereon and adjustable relative to the trip 34, so that the lever 31 is lifted by the upswing of the saw frame.

The wedge 36 is slidably guided in the bracket 30 and linked at 37 to the lever 31 so that the rise of the lever lifts the wedge which is interposed between the vise jaw 7 and the stock 8. The rearward extension 38 of the lever bears against the top of the expansion spring 39 interposed between the lever extension 38 and the bracket 30 to hold the wedge 36 normally depressed for locking the stock 8 against movement between the jaws 6, 7 of the vise.

The extended length of the stock 8 rests within the carriage 40 where it is locked by the adjustable screw clamp 41, see Fig. 2. The carriage is mounted upon the flanged wheels running along the top edges of the angle bar rails 22, 23. This carriage is advanced by the traction rod 42, the front end of which is fixed in the arm 43 mounted upon the forward end of the piston rod 44 having a piston mounted thereon and slidable within the closed cylinder 45. This cylinder has its opposite ends adjustably mounted upon the foot angle of the rails 22, 23 by the clamps 46, 47 by means of which it is adjusted along the rails relative to the available length of the stock 8.

An automatic clutch is interposed between the traction bar 42 and the carriage 40, see Fig. 4, consisting of a round washer 49 of hardened metal surrounding the bar 42 and resting within an angular socket 50. The expansion spring 51 mounted in a hole in the rearward side of the socket urges the washer 49 against the opposite side of the socket that is inclined vertically relatively to the horizontal axis of the traction bar 42. When the traction bar is advanced by the piston rod 44 the washer 49 jams on the rod and advances the carriage 40 and the length of stock 8 clamped therein when the wedge 36 is released. When the piston rod 45 is retracted by the spring 52 interposed between the arm 43 and the end of the cylinder at 53, the friction of the rod within the washer forces the washer toward the vertical plane against the spring 51 which frees the rod 42 from the washer 49 and the carriage remains stationary on the stock 8.

The mechanical functions of the saw and the stock feeding mechanisms are synchronized by a pneumatic power system controlled by the rise and fall of the saw frame. Referring to Fig. 1, compressed air flows from the pump 54 through the flexible tube 55, the pressure regulator 56 and registers the adjusted pressure on the dial 57 and is stopped by the self-closing stop valve 58 that is mounted on the upper end of the angle bar 25. From the stop valve 58 the main pressure line 59 continues to the self-closing vent valve 60. The intermediate lateral lines 61, 62 are connected to the saw frame lifting cylinder 26 and the stock feeding cylinder 45 respectively. The stop valve 58 has the actuating lever 63 fulcrumed at 64 and has the detent guide 65. When the saw frame drops at the completion of a cut the adjustable valve trip 66 on the saw frame depresses the lever 63 and the valve stem and opens the stop valve 58.

This invention operates substantially as follows: When the saw 10 finishes the cut through the stock 8 the saw frame 11—13 descends to the horizontal position cushioned by the hydraulic cylinder assembly 20. The descent of the trip 66 against the stop valve lever 63 opens the stop valve 58 permitting the compressed air from the source 54 to advance the piston rod 28 and swing the saw frame upward on its pivot 15. It also acts through the stock feeding cylinder assembly at 45 to exert a forward pneumatic pull on the carriage 40 and the stock 8 clamped therein, but the carriage cannot advance until the wedge 36 is lifted by the wing nut 35 on the stem 33 which lifts the lever 31 linked to the wedge 36. When this wedge is lifted it releases the stock from the vice 6, 7 permitting the carriage 40 to advance the end of the stock against the fixed stop 67 which is adjustably mounted on the saw table 1 in the usual manner, see Fig. 4. As the saw frame is lifted by the cylinder 26 the trip 66 permits the stop valve to close automatically and simultaneously as the saw frame is lifted by the cylinder 26. The closing of the stop valve 58 is retarded in its closing by the frictional detent 65 on the valve lever 63.

As the saw frame approaches its extreme lift as described, the adjustable pin 68 on the saw frame exerts a cam action against the lever 69 of the vent valve 60 to release the pressure within the lifting cylinder 26 and stock feeding cylinder 45 when the vent valve 60 is opened. This permits the saw frame to descend by gravity, under control of the retarding action of the hydraulic cylinder 20, until the band saw 10 rests upon and cuts into the stock 8. When the descent of the saw frame starts it releases the lift of the wing nut 35 permitting the expansion of the spring 39 to force the wedge 36 into the vice to lock the stock 8 against the thrust of the saw 10 throughout the cutting cycle, after which the pneumatic control system automatically lifts the saw frame for repeating the lifting cycle previously described, following the successive sawing cycles seriatim.

This disclosure has been confined to the application of the invention to a specific type of power band saw. It is equally applicable to any type of saw that swings on a pivot and will actuate the pneumatic control system for advancing and locking the stock in sawing position. Band saws, reciprocating and rotary power saws are believed to be an equivalent element for combination with the present stock feeding and clamping assembly. With ordinary skill the invention may be adapted to move the stock to and from a stationary cutting-off saw with appropriate modification within the spirit of the invention.

Having fully described this invention and its mode of operation what I claim and desire to secure by Letters Patent is:

1. In combination with a power driven cut-off machine having a table with a stop and a stock holding vise thereon; a power driven cut-off saw, a swing frame mounting said saw and pivoted to said table; a pneumatic frame lifting unit interposed between said frame and table; a stock supporting frame extending laterally to the plane of said saw; a stock supporting carriage movable on said frame and having stock clamping means thereon and adapted to feed said stock through said vise and against said stop when said vise is released; a wedge interposed in said vise and linked to a spring urged lever on said vise for normally holding said wedge against the stock in said vise; a link on said lever operated by a bracket on said frame for releasing said wedge when said swing frame is lifted; pneumatic means on said stock supporting frame for progressively advancing said carriage when said wedge is lifted; a pneumatic pressure line connected to said swing frame lifting unit and said pneumatic means for advancing said carriage; a stop valve and a vent valve in said pressure line; means on said swing frame for opening said stop valve when said frame descends and opening said vent valve when said frame ascends.

2. Apparatus of the character described comprising a tool mounted for advancement to a work piece to make a cut and thereby sever a length of the work piece, and for retraction from the work piece; means for automatically advancing and retracting said tool; reciprocable feed means having a work stroke for advancing the work piece a predetermined distance and also having a return stroke; fluid pressure means for effecting said work stroke; resilient means for automatically and mechanically effecting said return stroke; clutch means automatically operable to engage the work piece with and disengage it from the feed means and fluid pressure means during the work stroke and return stroke, respectively; and valve means operable by advancement and retraction of the tool to deliver fluid pressure to the fluid pressure means at the conclusion of the cutting operation and to effect said work stroke after the tool has cleared the work piece, and to bleed fluid pressure from the fluid pressure means after the conclusion of said work stroke.

3. Apparatus of the character described comprising a tool mounted for advancement by gravity to a work piece to make a cut and thereby sever a length of the work piece, said tool being also mounted for retraction from the work piece; a first fluid pressure means for retracting said tool; reciprocable feed means having a work stroke for feeding the work piece a predetermined distance and also having a return stroke; a second fluid pressure means for effecting said work stroke; resilient means for automatically and mechanically effecting said return stroke; clutch means automatically operable to engage the work piece with and disengage it from the feed means and second fluid pressure means during the work stroke and return stroke, respectively; a first valve means operable by advancement and retraction of the tool to deliver fluid pressure to the first pressure means after completion of the cutting operation, and to bleed pressure therefrom after the tool has cleared the work piece; and a second valve means, also operable by advancement and retraction of the tool to deliver fluid pressure to the second pressure means and to effect said work stroke after the tool has cleared the work piece, and to bleed pressure therefrom after the work piece has been fed a predetermind distance.

4. Apparatus of the character described comprising a tool; means mounting the tool for advancement to a work piece to make a cut and thereby sever a length of the work piece, and for retraction from the work piece; means for automatically advancing and retracting said tool; reciprocable feed means having a predetermined work stroke for advancing the work piece a predetermined distance and also having a return stroke; fluid pressure means for effecting said work stroke; means for automatically effecting said return stroke; clutch means automatically operable to engage the work piece with and disengage it from the feed means and fluid pressure means during the work stroke and return stroke, respectively; clamping means for clamping the work piece during the cutting operation, including a wedge and means connecting the wedge with the tool mounting such that the wedge clamps the work piece during the cutting operation and frees the work piece after completion of the cutting operation; and valve means operable by advancement and retraction of the tool to deliver fluid pressure to the fluid pressure means at the conclusion of the cutting operation and to effect said work stroke after the tool has cleared the work piece, and to bleed fluid pressure from the fluid pressure means after the conclusion of said work stroke.

CARL E. BECK.

REFERENCES CITED

The following references are of record in the file of this patent:

UNITED STATES PATENTS

| Number | Name | Date |
|---|---|---|
| 787,510 | Herbert | Apr. 18, 1905 |
| 1,782,692 | Lawson | Nov. 25, 1930 |
| 2,005,052 | Rubin | June 18, 1935 |
| 2,368,138 | Hayden | Jan. 30, 1945 |

FOREIGN PATENTS

| Number | Country | Date |
|---|---|---|
| 406,824 | Great Britain | Mar. 8, 1934 |